(12) United States Patent
Huang et al.

(10) Patent No.: US 7,006,280 B2
(45) Date of Patent: Feb. 28, 2006

(54) MULTI-STAGE FILTERED OPTICAL AMPLIFIER

(75) Inventors: Kao-Yang Huang, Plainsboro, NJ (US); John R. Costelloe, Freehold, NJ (US); Richard Williams, Englishtown, NJ (US)

(73) Assignee: JDS Uniphase Corporation, San Jose, CA (US)

( * ) Notice: Subject to any disclaimer, the term of this patent is extended or adjusted under 35 U.S.C. 154(b) by 176 days.

(21) Appl. No.: 10/726,458

(22) Filed: Dec. 3, 2003

(65) Prior Publication Data

US 2004/0114216 A1     Jun. 17, 2004

Related U.S. Application Data

(60) Provisional application No. 60/434,040, filed on Dec. 17, 2002.

(51) Int. Cl.
*H04B 10/12* (2006.01)
(52) U.S. Cl. .................................... 359/337.1
(58) Field of Classification Search .............. 359/337.1
See application file for complete search history.

(56) References Cited

U.S. PATENT DOCUMENTS

| | | | |
|---|---|---|---|
| 6,055,092 A * | 4/2000 | Sugaya et al. ............... | 359/337 |
| 6,327,405 B1 * | 12/2001 | Leyva et al. ................... | 385/37 |
| 6,359,726 B1 * | 3/2002 | Onaka et al. ............ | 359/337.1 |
| 6,445,493 B1 * | 9/2002 | Kohnke et al. ........... | 359/337.1 |
| 2002/0033995 A1 * | 3/2002 | Shimojoh et al. ........ | 359/337.1 |
| 2002/0041432 A1 * | 4/2002 | Onaka et al. ............ | 359/337.1 |

OTHER PUBLICATIONS

Y. Painchaud. Bragg Grating gain flattening filters with samll group delay ripples. Proc. 27th Eur. Conf. on Opt. Comm. (ECOC'01—Amsterdam) Th.M.1.2 pp. 490-491.*

* cited by examiner

*Primary Examiner*—Mark Hellner
*Assistant Examiner*—Ari M. Diacou
(74) *Attorney, Agent, or Firm*—Allen, Dyer, Doppelt Milbrath & Gilchrist, P.A.

(57) ABSTRACT

A multistage amplifier is disclosed for amplifying light over a wavelength band. A first and second span of amplifying fiber are optically coupled and a gain flattening filter (GFF) in-line with one of two spans of amplifying fiber is provided for attenuating certain wavelengths of amplified light. A first gain spectral response of the first and second spans of amplifying fiber including the GFF are measured over the wavelength band, and the shape of a ripple that oscillates as a function of wavelength in the form of a plurality of peaks or maxima and valleys in the form of minima occur at a plurality of different wavelengths, each different wavelength corresponding to a different channel. A second filter is provided finishing or compensating filter having a second spectral response that has a second plurality of peaks in the form of maxima and valleys in the form of minima is provided. The second filter is designed so that the second spectral response is absent at least 50% of four most predominant peaks or valleys at channels where peaks or valleys, respectively, were present in the first spectral response. The maximum ripple amplitude in the second spectral response is less than a maximum ripple amplitude in the first gain spectral response. This arrangement lessens unwanted effects of systematic error occurring when filters having similar ripple responses with wavelength are cascaded.

9 Claims, 3 Drawing Sheets

Gain Spectrum of a typical EDFA

MULTI-STAGE FILTERED OPTICAL AMPLIFIER

This application claims priority of U.S. Provisional Patent Application No. 60/434,040 filed Dec. 17, 2002, entitled "ULTRA FLAT GAIN OPTICAL AMPLIFIER" which is incorporated herein by reference for all purposes.

Wideband rare earth doped optical amplifiers such as erbium-doped fiber amplifiers (EDFAs) are typically comprised of a span of erbium doped optical fiber pumped with shorter wavelength radiation. For example, signal light having a wavelength within the range of 1525 nm to 1565 nm, within the C-band, is pumped with a light source of 980 nm to amplify the signal light. As is shown in FIG. 1, the gain spectrum of an erbium doped fiber amplifier with no additional filtering has a characteristic peak between 1524 and 1540 nm which falls rapidly within the remaining portion of the C-band, having a short flat section about 1550 nm. Doping erbium with dopants such as Samarium has worked well to further flatten the output spectrum within certain small wavelength bands, but has not provided a solution to gain equalization which covers the entire C-band.

Another solution to the providing an amplifier with a more equal gain spectrum across a wide wavelength band is to place a gain flattening filter inline. This solution attenuates certain bands of the output spectrum more than others, to attempt to provide a flatter output response. With conventional gain flattening filters, one can achieve a gain flatness, defined to be a difference between channels with highest and lowest gain, of less than 1 dB for the entire bandwidth of interest, which extends from about 1525 nm to 1565 nm. Notwithstanding, optimum results are usually achieved when several gain flattening filters cascaded. One limitation to this scheme is that the gain spectra of same or similar EDFA filters are typically the same, or systematic. That is, there is little randomness to their response. For example, peaks and valleys tend to appear at substantially same wavelengths, or within same channels from one amplifier to another. Unfortunately, when two similar or same amplifiers are cascaded, peaks and valleys at same wavelengths are increased, respectively as they are additive. Two peaks at a same wavelength in two cascaded amplifiers will result in a larger peak at the output, essentially proportional to the sum of the two peaks. The same result occurs for two valleys or minima at a same wavelength cascaded together; a larger relative valley results. As a result, the gain excursion for cascading many EDFAs increases linearly with the number of EDFAs, which becomes a major factor in limiting the distance of optical transmission between.

Providing a second filter in-line with a first filter is common practice. The object of the second filter is often to attenuate wavelengths that could not be attenuated by the first filter alone, and/or to further attenuate wavelengths partially attenuated by the first filter. Essentially the overall object of placing a second filter in-line with a first filter in an optical amplifier is to provide an output response, which is flatter across the wavelength band of interest. The cascaded arrangement is typically designed with an overall desired output response. What has not be considered and ameliorated in a simple fashion heretofore, is the problem of repeating or cascading small errors or anomalies, i.e. unwanted characteristic ripple found in most same or similar EDFA's It is an object of this invention to provide a first gain flattening filter having an output spectrum with unwanted ripple in a plurality of channels, and providing a second cascaded filter which ensures that same unwanted ripple in same channels does not repeat at least 50% of the time by the cascaded combination of filters.

It is an object of this invention to provide a second stage filter that is designed to be absent some peaks or valleys in an output spectrum when cascaded with a first filter, where peaks and valleys were present in an output spectrum of the first filter.

SUMMARY OF THE INVENTION

A optical amplifier is provided for amplifying light over a wavelength band comprising: a first span of amplifying fiber; a gain flattening filter (GFF) in-line with the first span of amplifying fiber for attenuating predetermined wavelengths of amplified light, WHEREIN A FIRST gain spectral response of the first span of amplifying fiber including the GFF measured over the wavelength band has shape of a ripple that oscillates as a function of wavelength such that a plurality of peaks in the form of maxima and valleys in the form of minima occur at a plurality of different wavelengths, each different wavelength corresponding to a different channel; and, a second compensating filter in-in line with one of the first span of fiber having a SECOND spectral response that has a second plurality of peaks in the form of maxima and valleys in the form of minima, wherein the second spectral response is absent at least 50% of four most predominant peaks or valleys at channels where peaks or valleys, respectively, were present in the first spectral response, and WHEREIN a maximum ripple amplitude in the second spectral response is less than a maximum ripple amplitude in the first gain spectral response.

In accordance with another aspect of the invention, there is provided, a compensating optical filter for placement in-line with a gain flattening filter in an optical amplifier, the compensating optical filter having an output gain response when cascaded with the gain flattening filter in an optical fiber amplifier such that 50% of 8 ripples and/or valleys present at 8 wavelengths in an output spectrum of the amplifier absent the compensating filter are absent at said 8 wavelengths when the compensating filter is in-line with the gain flattening filter.

BRIEF DESCRIPTION OF THE DRAWINGS

Exemplary embodiments of the invention will now be described in conjunction with the drawings in which:

FIG. 2 shows a dual stage amplifier having two erbium amplifiers 22 and 24 with a gain-flattening filter 26, therebetween. Each of the amplifiers is comprised of a span of erbium that is pumped with pump light, (not shown). FIG. 3 illustrates a three-stage amplifier having amplifiers 32, 34, and 36. A compensating filter 38 is disposed between the first two amplifiers and a gain-flattening filter 26 is disposed between the second and third filters. In some embodiments the location of these filters, in-line with the amplifiers changes.

Referring now to FIG. 4 two plots are shown on a single graph, the upper plot having shaded squares representing data points along the graph and a lower plot including diamond-shaped nodes representing a second set of data points. It can be clearly seen that the lower plot of relative gain versus wavelength with only a GFF in-line with an EDFA is considerably less flat than the upper plot wherein both the GFF and a compensating filter are present in the two stage optical amplifier. Aside from the obvious difference in relative gain flatness 0.38 dB for the double stage double filtered device versus 0.85 dB for the double stage single filtered device, there are other interesting and important aspects to consider. For example, the amplifier represented by the upper plot has been specifically designed to ensure that at least a predetermined number of wavelengths where maxima and minima occur in the upper plot, are different for the lower plot; or stated differently, that maxima and minima present in the lower plot at respective wavelengths, do not appear as maxima and minima at least 50% of the time in the upper plot when two filters are cascaded. It can be seen that maxima at channels having wavelengths 1531.89, 1537.39, 1538.97, 1540.55, 1546,91, 1551.72, 1554.94, 1556.55, 1558.98, 1561.41 and 1563.04 in the upper plot do not occur as maxima, or peaks for same channels in the lower plot. Correspondingly, minima for example, in the upper plot at wavelengths 1534.25, 1539.76, 1544.52, 1546.11, 1547.71, 1555.74, 1558.17 do not have corresponding minima in the lower plot for same channels. Maxima and minima at wavelengths 1538.18, 15.41.35, 1551.72, 1555.74, 1563.04, 1563.98 and 1565.49 respectively, do not occur as same in the upper plot. The second compensating filter is designed so that at least 50% of these peaks are valleys are not repeated, that is, do not lie at a same wavelength for the GFF alone and for the GFF with the compensating filter. This substantially corrects for the otherwise systematic accumulation and augmentation of peaks and valleys otherwise present in systems where similar filters are cascaded. When designing the compensating filter, one can look at the lower plot representing the EDFA with a GFF alone, and identify maxima and minima. Then, a compensating filter to be cascaded is selected to ensure that the ripple present from an output spectrum from the two-cascaded filters is at least substantially shifted from the ripple present on single stage GFF alone, thereby obviating systematic anomalies.

Figure 1:
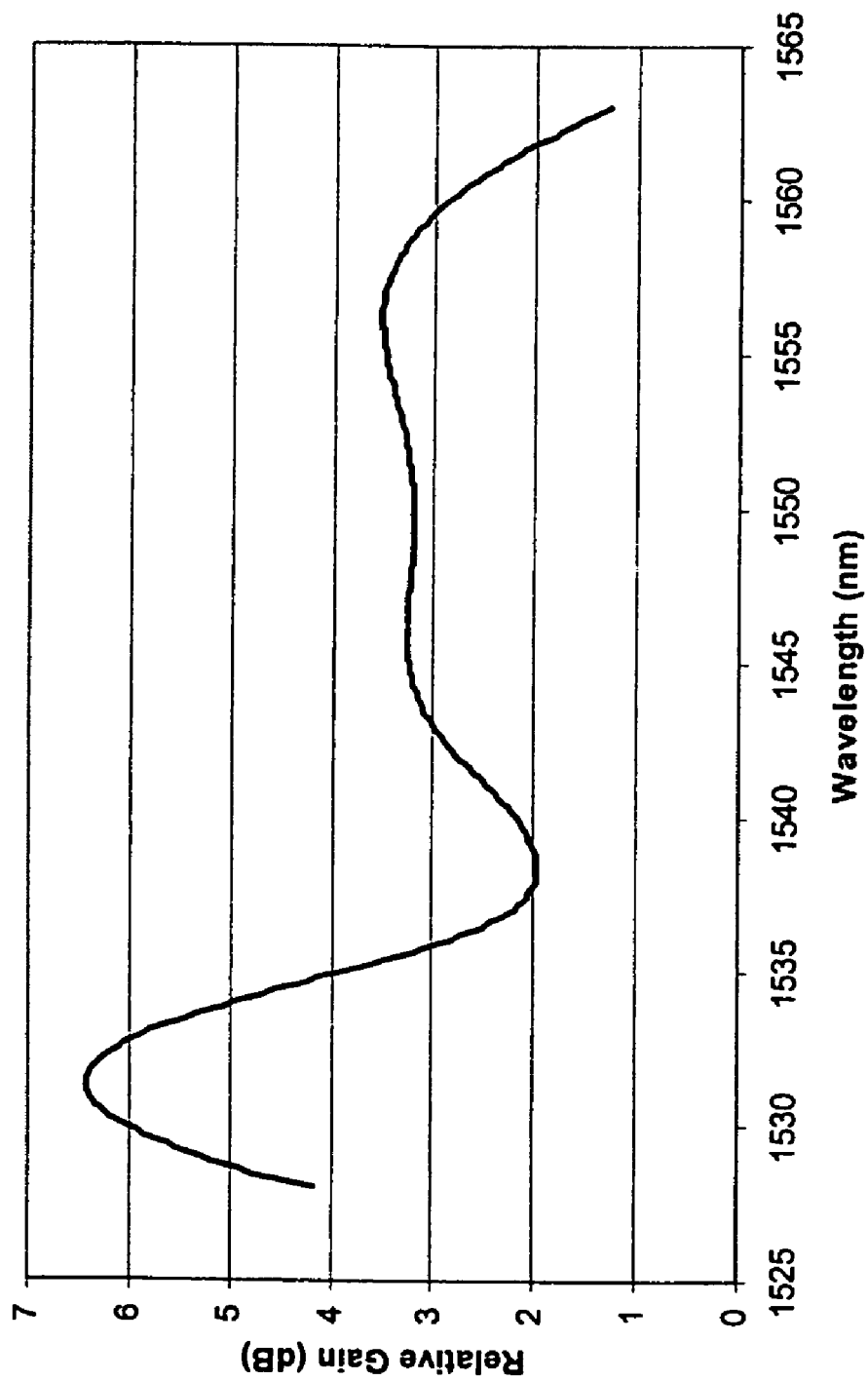
FIG. 1 is a graph illustrating the characteristic gain spectrum of a typical erbium doped fiber amplifier across the C-band, with no filtering present.
Figure 2:
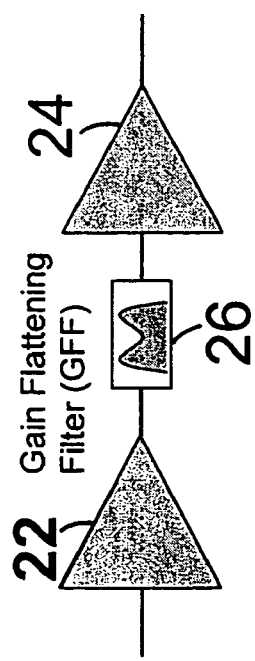
FIG. 2 is a schematic diagram of a two-stage erbium doped fiber amplifier having a GFF in-line and between two spans of erbium fiber.
Figure 3:
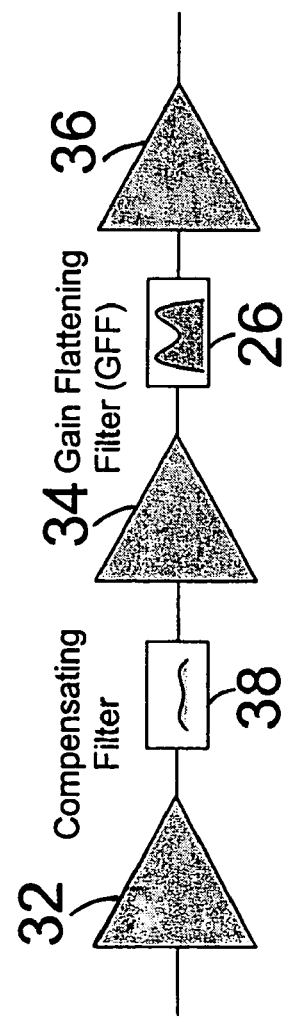
FIG. 3 is a schematic diagram of a three-stage erbium doped fiber amplifier having a GFF and a compensating filter in accordance with this invention.
Figure 4:
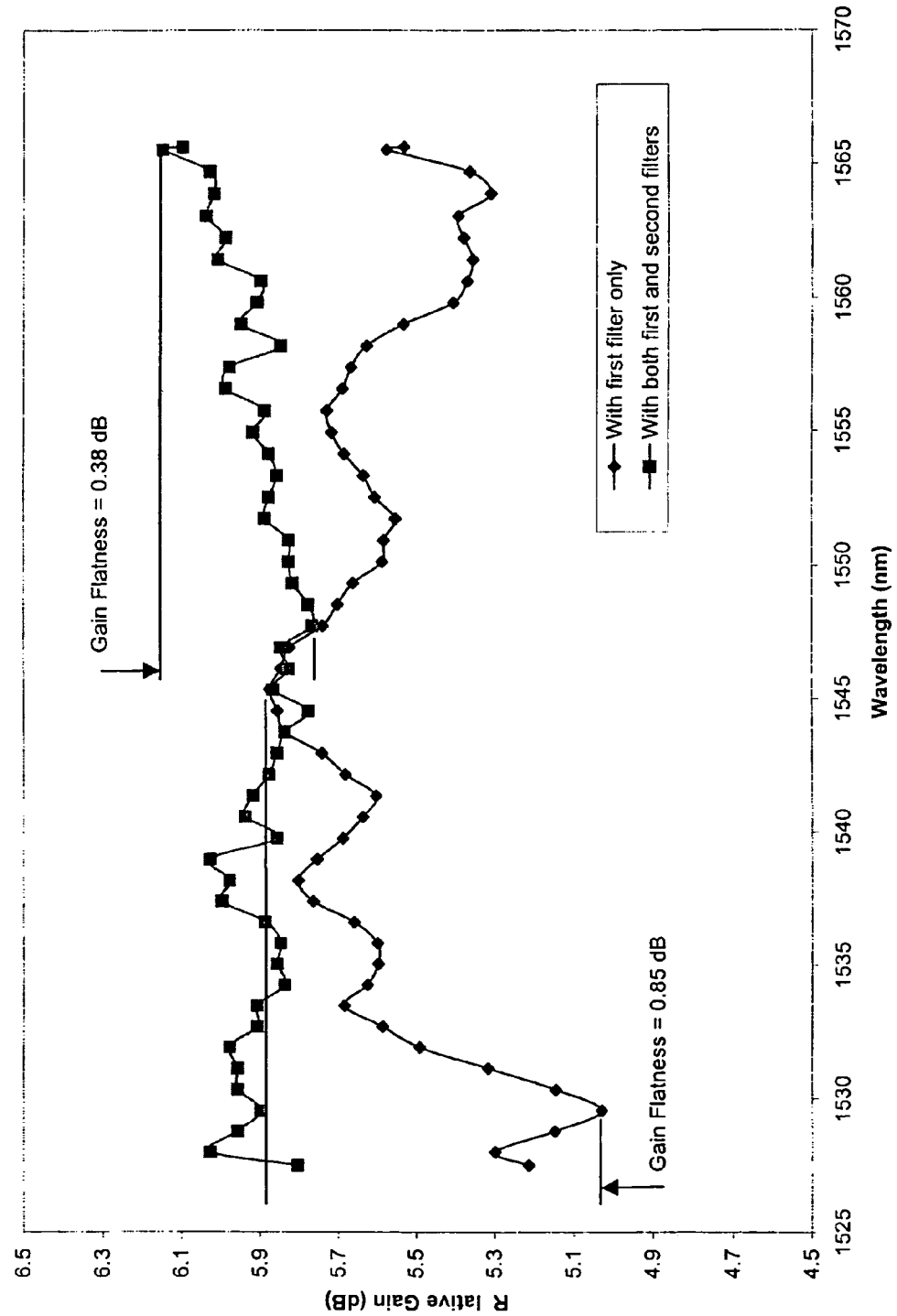
FIG. 4 illustrates plots for two different erbium doped fiber amplifiers, an upper plot illustrating relative gain flatness for and EDFA having a first gain flattening filter (GFF) cascaded with a second stage compensating filter; and a lower plot wherein only a GFF is used with compensating filter.

Ideally, if a peak was present in the output spectra of the GFF alone, at wavelength "λ1" than a valley or flat would occur at a same wavelength when two amplifiers were cascaded. Although this is not a requirement, the important consideration is obviating or lessening systematic ripple that would otherwise be present when cascading to similar filters.

Bragg grating filter technology has advanced over the years and provides for relatively simple techniques to design and manufacture filters having a predetermined or desired output response. Since these filters are generally written or impressed into photosensitive optical fibers using a phase mask, the design of the phase mask to yield a particular output response is required. Numerous computer programs are commercially available for designing Bragg gratings.

In the bottom plot representing an EDFA with only a GFF, there are approximately 6 peaks and 5 valleys. In the upper plot there are approximately 12 peaks and a similar number of valleys. This invention provides a combination of filters that will ensure that at least 50% of 8 peaks and valleys present with the with the GFF alone, will be absent in the output response of the GFF with the compensating filter at same wavelengths. The invention further provides a combination of first and second filters that has a lesser maximum ripple response using the two-cascaded filters than is present only using the GFF filter.

What is claimed is:

1. A multistage amplifier for amplifying light over a wavelength band comprising:
   a first span of amplifying fiber;
   a second span of amplifying fiber optically coupled with the first span;
   a gain flattening filter (GFF) for attenuating certain bands of the output spectrum more than others, to attempt to provide a flatter output response in-line with at least one of the first and second spans of amplifying fiber for attenuating predetermined wavelengths of amplified light, WHEREIN A FIRST gain spectral response of the first and second spans of amplifying fibre including the GFF measured over the wavelength band has shape of a ripple that oscillates as a function of wavelength such that a plurality of peaks in the form of maxima and valleys in the form of minima occur at a plurality of different wavelengths, each different wavelength corresponding to a different channel; and,
   a second gain flattening compensating filter for attenuating certain bands of the output spectrum more than others, to attempt to provide a flatter output response in-line with one of the first and second spans of fiber having a SECOND spectral response that has a second plurality of peaks in the form of maxima and valleys in the form of minima, wherein the second spectral response is absent at least 50% of four most predominant peaks or valleys at channels where peaks or valleys, respectively, were present in the first spectral response, and WHEREIN a maximum ripple amplitude in the second spectral response is less than a maximum ripple amplitude in the first gain spectral response.

2. A multistage optical amplifier as defined in claim 1, wherein the GFF is downstream of the first span of amplifying fiber and is disposed to receive light from at least one of the first and second spans of amplifying fiber.

3. A multistage optical amplifier as defined in claim 1 wherein the second compensating filter is a Bragg grating.

4. A multistage optical amplifier as defined in claim 2, wherein the second compensating filter is a Bragg grating and wherein the second spectral response has minima at at least 10% of wavelengths where peaks were present in the first spectral response.

5. A multistage optical amplifier as defined in claim 3 wherein the wavelength band is from 1525 to 1565 nm and wherein the amplifying fiber is rare earth doped.

6. A multistage optical amplifier as defined in claim 1 wherein the second compensating filter is disposed between the first and second spans of optical fiber.

7. A multistage optical amplifier as defined in claim 1 wherein the GFF is disposed between the first and second spans of optical fiber.

8. An amplifier for amplifying light over a wavelength band comprising:
   a first span of amplifying fiber;
   a gain flattening filter (GFF) for attenuating certain bands of the output spectrum more than others, to attempt to provide a flatter output response in-line with the first span of amplifying fiber for attenuating predetermined wavelengths of amplified light, WHEREIN A FIRST gain spectral response of the first span of amplifying fiber including the GFF measured over the wavelength band has shape of a ripple that oscillates as a function of wavelength such that a plurality of peaks in the form of maxima and valleys in the form of minima occur at a plurality of different wavelengths; and, a second compensating gain flattening filter for attenuating certain bands of the output spectrum more than others, to attempt to provide a flatter output response having a SECOND spectral response that has a second plurality of peaks in the form of maxima and valleys in the form of minima, wherein the second spectral response is absent at least 50% of peaks at wavelengths where peaks were present in the first spectral response, and WHEREIN a maximum ripple amplitude in the second spectral response is less than a maximum ripple amplitude in the first gain spectral response.

9. An amplifier as defined in claim 8, wherein the amplifying fiber is erbium-doped fiber.

* * * * *